AUTOMATIC UNCOUPLING APPARATUS FOR A RECORDER REPRODUCER

Filed March 5, 1964 2 Sheets-Sheet 1

INVENTOR.
FRIEDRICH LAA
KARL RUPP
BY
Frank R. Jeifari
AGENT

AUTOMATIC UNCOUPLING APPARATUS FOR A RECORDER REPRODUCER

Filed March 3, 1964

FRIEDRICH LAA
KARL RUPP
INVENTOR.
BY
[signature]
AGENT 3,355,557

AUTOMATIC UNCOUPLING APPARATUS FOR A RECORDER/REPRODUCER

Friedrich Laa and Karl Rupp, Vienna, Austria, assignors to North American Philips Company, Inc., New York, N.Y., a corporation of Delaware Filed Mar. 3, 1964, Ser. No. 349,112
Claims priority, application Austria, Mar. 13, 1963, A 1,981/63
7 Claims. (Cl. 179—100.2)

ABSTRACT OF THE DISCLOSURE

A mechanism for automatically turning off a recording and/or playback apparatus. An electromagnet serves to engage and release a spring biased lever. The lever, when released, releases a locking mechanism holding a push button in an operative position thereby turning off the apparatus. A sensing device coupled with the record carrier, activates the electromagnet.

Figure 1:
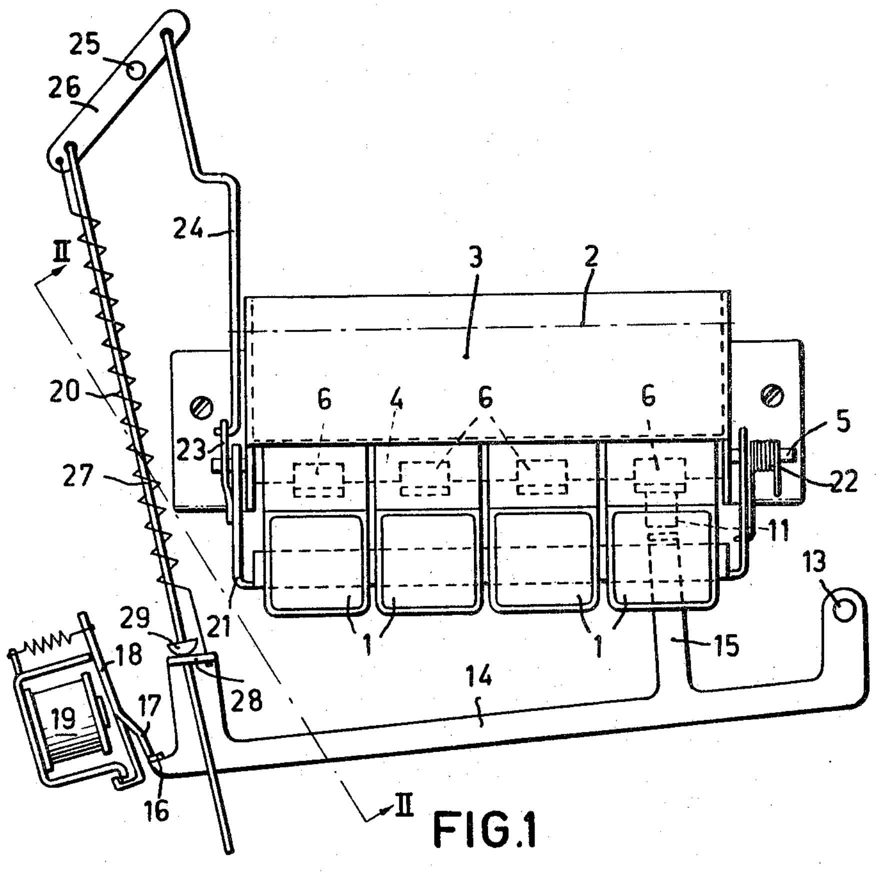

The invention relates to a mechanism for automatically turning off a recording and/or playback apparatus, in which push buttons are provided for selecting one of a number of operating conditions, and a locking device is provided for retaining the component parts in their operating positions. The operating positions relate to the various functional movements of the record carrier, for example, forward or rewind at one of the speeds possible for scanning, fast forward or fast rewind, and the conditions "playback" or "record."

It is known to effect uncoupling of locking devices automatically by means of marks provided on the record carrier, by which the current circuit of an electromagnet is closed at the desired instant; for example when the end of a record carrier is reached, the locking device, holding the push button in the operative position, is uncoupled by the movement of the electromagnet armature. In the known devices comparatively large forces must be overcome, and thus powerful electromagnets must be used. These are not only expensive but also require a large operating current. Large currents cannot be switched directly by several types of marks, for example, foil on a record carrier which slides on two contacts; hence, it is necessary to provide a separate auxiliary magnet for switching a separate large current circuit for the uncoupling magnet. As a result, the known devices are very expensive and also comparatively complicated.

It is an object of the invention to avoid these disadvantages.

According to the invention the forces for uncoupling the locking device are supplied by the energy of a tensioned spring. Thus, the electromagnet need not move the operating member, but only provide a means for releasing the locking device. The disadvantages of the known devices are not only overcome but the end result desired is also achieved with extremely simple means. The device according to the invention is also economical and reliable.

Figure 2:
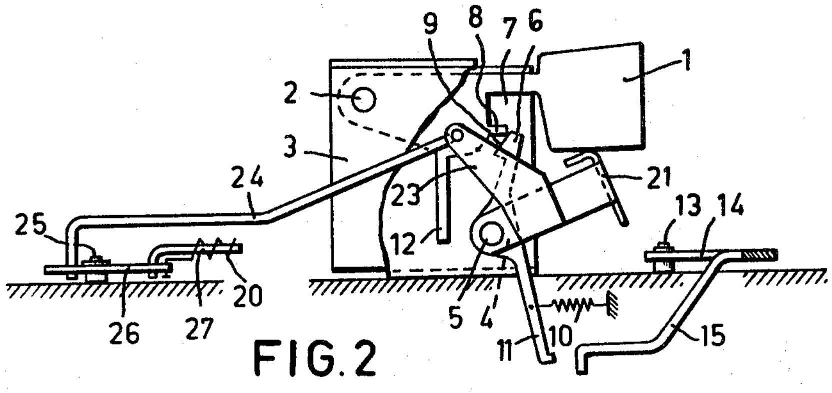
Figure 4:
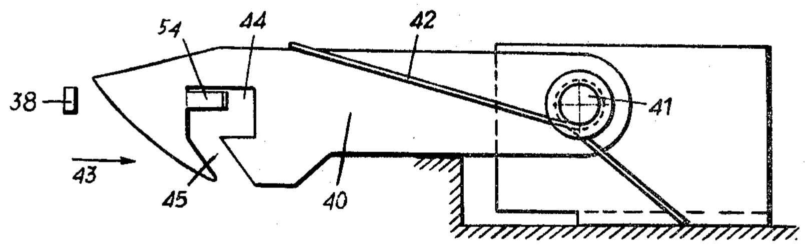
Figure 3:
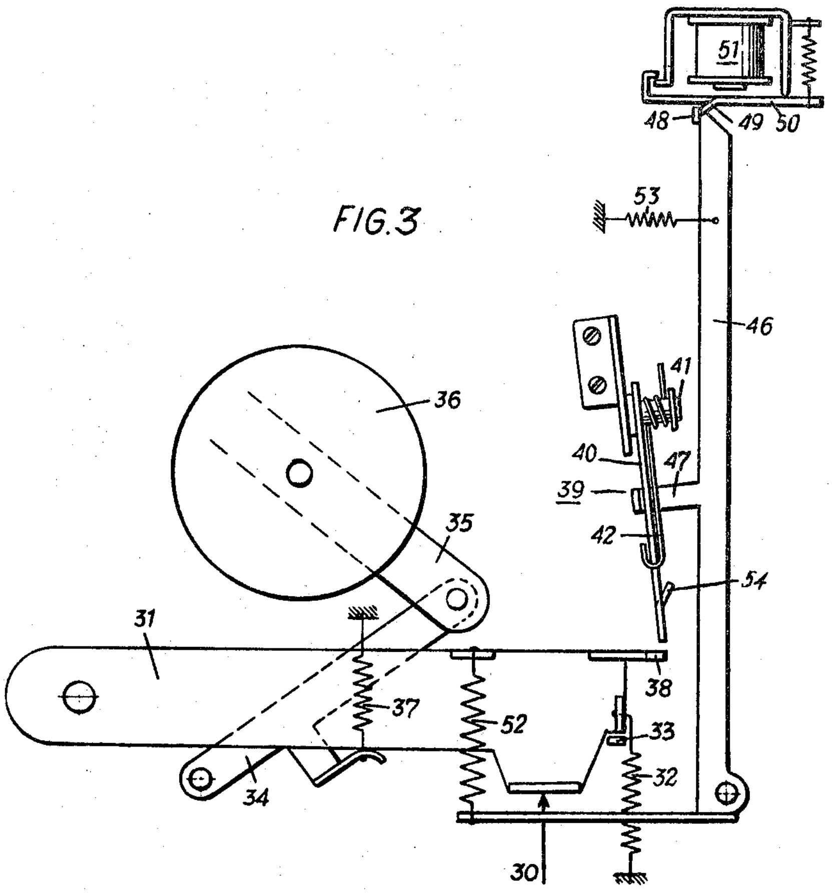

In order that the invention may readily be carried into effect, it will now be described more fully with reference to embodiments shown in the drawings, in which:

FIG. 1 shows a plan view of a device according to the invention comprising four keys for switching operating conditions for which a common locking device is provided, FIG. 2 shows the device according to FIG. 1 in cross-section taken along the line II—II of FIG. 1, in which the support for the keys is partly broken away, FIG. 3 shows a plan view of an embodiment of the invention in which a single key locking device is used, and FIG. 4 shows a side elevation on an enlarged scale of the locking device used in the embodiment shown in FIG. 3.

In the embodiment of FIGS. 1 and 2, four push buttons 1 are provided in a U-shaped brace 3 and are rotatable about a shaft 2. A locking device 4 is provided for each push button 1. Each locking device 4 is pivotal around a shaft 5 and includes a hook-shaped extension 6 for engaging the adjacent push button when the push button is depressed or moved into an operative position. Each of the buttons 1 is provided with a recess 7 so that it can be depressed without being hindered by the hook 6. A projection 8 located on each of the buttons adjacent the recess 7 provides a latching connection with the hook 6. A spring 10 which is connected to a downturned lug 11 on the locking device 4 biases the hooks 6 into contact with the projection 8. When a button 1 is depressed, the projection 8 slides along the inclined face 9 of the hook 6 thereby pivoting the whole locking device 4 until the projection 8 is located below the hook 6, after which the hook 6 associated with the depressed button engages and holds the button in the operating position. Buttons previously depressed are uncoupled by the rotation of the locking device caused by the last depressed button. An extension 12 on each of the buttons 1 provides a connection between the push button and apparatus to be operated (not shown). The linkage between the extension 12 and the apparatus is known in many variations, for example retaining rails swingable about a shaft or slidable along a shaft.

For automatic uncoupling of the locking device 4, the lug 11 is rotated; in the embodiment of FIGS. 1 and 2 this is accomplished by rotating the lever 14 clockwise (FIG. 1) around the pin 13 connected to the base plate of the apparatus. Lever 14 is provided with an extension 15 for engaging lug 11. At one end the lever 14 has an abutment member 16 which engages a lug 17 bent outwardly and forwardly at an angle from an armature 18 of an electromagnet 19 thereby forming a pawl mechanism. Movement of the lug 17 towards the energized electromagnet 19 releases the lever 14 for rotation (clockwise) out of its rest position (FIG. 1). The electromagnet 19 may be actuated by a relatively small current in a circuit which includes two contacts on either side of the record carrier and a conducting layer on the record carrier for closing the contacts. Since the only member to be released is the abutment member 16 when the armature 18 attracts, the magnet 19 may be small. Other sensing devices to activate the electromagnet 19 can be used such as marks which are scanned mechanically by feelers or control members operating by means of light energy.

The lever 14 will be rotated by the spring 20 with sufficient force to press against the lug 11 of the locking device 4. The spring 20 provides a biasing force on lever 14 when one of the buttons is depressed. To accomplish this, a brace 21 underlying the keys 1 is provided. The brace 21 is rotatable about the shaft 5 independently of the locking device 4 and is held in contact with the keys 1 by a spring 22. A pivoting movement of the brace 21 results when one of the keys 1 is depressed. This movement is transmitted by an arm 23 on the lever 21, and a rod 24 to a pivotal lever 26 connected to the pin 25. The spring 20 is connected to the lever 26. Clockwise rotation of lever 26 (FIG. 1) biases the spring 20. As soon as the magnet 19 attracts the armature 18, the energy of the spring 20 is released moving the lever 14 into contact with the locking device 4 and pivoting the locking device out of engagement with the button 1.

In addition to the spring 20 a rod 27 is connected to the uncoupling lever 14 and to the lever 26. One end of the rod 27 is slidable in an apertured lug 28 on lever 14. However, this sliding movement is limited in the direction of the pull of the spring 20 by an abutment ring 29 secured to the rod 27. After uncoupling the locking device 4, the brace 21 is moved in a counter clockwise direction (FIG. 2) under the action of the spring 22. The lever 14 is thus moved counter clockwise via the rod 24, the lever 26, and the rod 27 until it snaps into engagement with its abutment 16 behind the lug 17 of the armature 18. Then the apparatus is again ready for another uncoupling operation.

In the embodiment shown in FIG. 3 one key is used for establishing movement of the record carrier. In this embodiment a transmission member is held in its operating condition when operating the button for the first time and is uncoupled from this condition when successively operating the same button again. A button (not shown) pressed in the direction indicated by an arrow 30, presses on a lever 31, the rest condition of which is determined by a spring 32 and an abutment 33. When lever 31 is moved in the direction of the arrow 30, the levers 34 and 35 are released for movement by the pull of the spring 37. Wheel 36 is attached to lever 35 by a common shaft. The wheel 36 couples a drive shaft with a take-up reel shaft (not shown). Lever 31 is held in its operating position by the end 38 and the locking device 39. FIG. 4 shows a side elevation of this locking device 39. It comprises a plate 40 journalled on a pin 41, so that it not only pivots in a plane at right angles to the pin, with the pin as the axis, but may also move axially along the pin (left and right in FIG. 3). A spring 42 forces the plate 40 downward (as seen in FIG. 4). Plate 40 is bevelled so that when the lever 31 is swung, the end 38, which is moved in the direction of the arrow 42 (FIG. 4) lifts the plate 40. The plate 40 is provided with a rectangular aperture 44 and an oblique channel 45. As soon as the lever 31 is moved in the direction of arrow 30 to an extent that the extension 38 lies below the opening into the channel 45, the spring 42 moves the plate 40 back down from its previously elevated position. When the lever 31 is released, the spring 32 moves the lever 31 in the direction opposite the arrow 30 and the extension 38 is cammed into the left hand side of the aperture 44. The left hand side of the aperture prevents the extension 38 from further movement and lever 31 is held in its operating position.

The extension 38 and the plate 40 are angularly positioned so that the extension 38 crosses only the free end of the plate. Inside the aperture 44 a lug 54 is bent to the exterior from the plate 40 (in FIG. 4 towards the viewer). If the lever 31, while in the operating position, is again depressed in the direction of the arrow 30, the extension 38 moves to the right hand limiting side of the aperture 44 of the plate 40 (FIG. 4). The plate 40 moves downwardly further until the upper limiting side of the aperture 44 lies on the extension 38. When the force (arrow 30) is removed the spring 32 withdraws the lever 31 from plate 40 by the action of the extension 38 engaging the rear side of the lug 54 and forcing the plate 40 axially of shaft 5 and then the lever 31 is returned to its rest position by the spring 32. The operating position may be automatically turned off (instead of by a renewed manual pressure) by the uncoupling lever 46 having an arm 47 provided as the operating member. An extension 48 provided at the end of the uncoupling lever 46 engages a lug 49 on the armature 50 of an electromagnet 51, thereby forming a pawl mechanism as shown in the example of FIG. 3. The lug 49 retains the uncoupling lever 46 in its rest position when the spring 52, which is connected to the transmission lever 31, is tensioned by movement of lever 31 in the direction of arrow 30. Movement of armature 50 towards electromagnet 51 releases extension 48 which permits movement of lever 46 clockwise by tensioned spring 52. Then arm 47 pulls plate 40 to release lever 31. The return to the rest position and the resnapping into engagement of the extension 48 with the lug 49 after uncoupling is ensured by a small return spring 53.

It will be understood that numerous structural variations are possible within the scope of the invention. For example, when several keys are used in which every key comprises a separate locking device, a common operating member may be provided which has an uncoupling effect on each of the locking devices for each key or push button and in which a spring is connected to each key. It is not essential to the invention that the locking devices block the keys themselves. In the device shown in FIG. 3 a button, for example, a bell button, may be provided at the place indicated by the arrow 30 which, when depressed, acts upon the lever 31 but is not connected to it in any manner.

What is claimed is:

1. Automatic uncoupling apparatus for a recorder/reproducer to be operated by marks on the record carrier and an associated circuit closed by said marks, and in which at least one operating condition of said recorder/reproducer is controlled by a push button and associated means which are locked in an operating position, the combination comprising; locking means for releasably holding said push button and associated means in an operating position, uncoupling means connected with said locking means, a pawl means connected with said uncoupling means for latching said uncoupling means in a rest position, electromagnetic means connected with said pawl means for latching and unlatching said uncoupling means in said rest position, a first biasing means connected with said uncoupling means at one location thereon for moving said uncoupling means to release said locking means, and means interconnecting said first biasing means with said push button and associated means for energizing said first biasing means when said push button and associated means are moved into an operating position from an inoperative position.

2. Automatic uncoupling means according to claim 1 wherein: said locking means for releasably holding said push button and associated means in an operating position comprises a pivotal locking member underlying said push button, said pivotal locking member having a hook-shaped extension thereon for engaging said push button when said push button is moved into an operative position; said uncoupling means comprises a rotatable uncoupling lever adjacent said locking means, said uncoupling lever being movable from a rest position to an operative position wherein said uncoupling lever contacts said pivotal locking member thereby releasing said push button when said push button is engaged; said pawl means comprises an abutment member connected to one end of said uncoupling lever and a lug connected with the armature of said electromagnetic means for engaging said abutment member when the armature is in the deenergized position thereby maintaining said uncoupling lever in said rest position and for disengaging said abutment member when said armature is energized thereby permitting said uncoupling lever to move to said operative position; and said means interconnecting said first biasing means and said push button for energizing said first biasing means when said push button and associated means are moved into said operative position comprises a brace pivotally engaging said push button, a rod engaging said brace, and a pivotal lever engaging said rod, with said first biasing means comprising a tension spring interconnecting said uncoupling lever and said pivotal lever, whereby movement of said push button into said operative position pivots said brace into an operative position, thereby tensioning said first biasing means.

3. Automatic uncoupling apparatus according to claim 1 wherein said uncoupling means comprises an uncoupling lever, means for pivotally supporting said uncoupling lever; said pawl means comprising an abutment member at one end of said uncoupling lever, and a lug connected with the armature of said electromagnetic means for engaging said abutment member in the deenergized position of said armature and disengaging said abutment member when said armature is energized.

4. Automatic uncoupling apparatus according to claim 3, wherein said locking means comprises a locking lever, means mounting said locking lever for pivotal movement about an axis and in an axial direction, a configured aperture in said locking lever for receiving said push button and associated means, said uncoupling lever engaging said locking lever for moving said locking lever in said axial direction whereby said push button and associated means are removed from said configured aperture.

5. Automatic uncoupling apparatus according to claim 1 with the addition of a second biasing means connected with said uncoupling means at another location thereon for receiving energy from movement of said uncoupling means by said first biasing means, said second biasing means moving said uncoupling means into holding engagement with said pawl means.

6. Automatic uncoupling means according to claim 5 wherein: said locking means for releasably holding said push button and associated means in an operating position comprises a pivotal locking member underlying said push button, said pivotal locking member having a hook-shaped extension thereon for engaging said push button when said push button is moved into an operative position; said uncoupling means comprises a rotatable uncoupling lever adjacent said locking means, said uncoupling lever being movable from a rest position to an operative position wherein said uncoupling lever contacts said pivotal locking member thereby releasing said push button when said push button is engaged; said pawl means comprises an abutment member connected to one end of said uncoupling lever and a lug connected with the armature of said electromagnetic means for engaging said abutment member when the armature is in the deenergized position thereby maintaining said uncoupling lever in said rest position and for disengaging said abutment member when said armature is energized thereby permitting said uncoupling lever to move to said operative position; and said means interconnecting said first biasing means and said push button for energizing said first biasing means when said push button and associated means are moved into said operative position comprises a brace pivotally engaging said push button, a rod engaging said brace, and a pivotal lever engaging said rod, with said first biasing means comprising a tension spring interconnecting said uncoupling lever and said pivotal lever, whereby movement of said push button into said operative position pivots said brace into an operative position, thereby tensioning said first biasing means.

7. Automatic uncoupling means according to claim 6 further comprising: a second biasing means for biasing said brace towards an inoperative position, and a second rod for interconnecting said pivotal lever and said uncoupling lever whereby release of said push button from said operative position releases said biased brace, whereby said brace pivotally moves to said inoperative position, said pivotal movement of said brace being transmitted to said uncoupling lever via said rod, said pivotal lever and said second rod thereby moving said abutment member into said rest position and latching engagement with said armature lug.

References Cited

UNITED STATES PATENTS

| | | | |
|---|---|---|---|
| 2,256,965 | 9/1941 | Sexton | 74—2 |
| 2,531,838 | 11/1950 | Bergemann | 74—2 |
| 3,305,240 | 2/1967 | Missriegler | 179—100.2 X |

BERNARD KONICK, *Primary Examiner.*

L. KURLAND, J. R. GOUDEAU, *Assistant Examiners.*